United States Patent
Cavelius et al.

(10) Patent No.: US 11,596,227 B2
(45) Date of Patent: Mar. 7, 2023

(54) STACKING STORAGE ARRANGEMENT

(71) Applicant: Jungheinrich Aktiengesellschaft, Hamburg (DE)

(72) Inventors: Jörg Cavelius, Bad Vilbel (DE); Michael Becker, Hainburg (DE); Markus Liebhaber, Oberursel (DE); Adrian Nowack, Mainz (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 16/999,216

(22) Filed: Aug. 21, 2020

(65) Prior Publication Data

US 2021/0052071 A1 Feb. 25, 2021

(30) Foreign Application Priority Data

Aug. 23, 2019 (EP) .................................. 19193379

(51) Int. Cl.
  *A47B 87/02* (2006.01)
(52) U.S. Cl.
  CPC ...... *A47B 87/0261* (2013.01); *A47B 87/0246* (2013.01)
(58) Field of Classification Search
  CPC . A47B 87/0261; A47B 87/0246; A47B 57/08; A47B 57/10; A47B 57/18; A47B 57/32; A47B 57/34; A47B 57/44; A47B 57/06; A47B 47/027; A47B 47/028; A47B 47/045; A47B 47/0083; A47B 47/058; A47B 47/00; Y10T 403/4677;
  (Continued)

(56) References Cited

U.S. PATENT DOCUMENTS 4,369,953 A * 1/1983 Greiner ................. E04H 17/166
  256/24
4,652,170 A * 3/1987 Lew ........................ E04B 1/617
  403/381
(Continued)

FOREIGN PATENT DOCUMENTS

CN 2803149 8/2006
CN 201005355 1/2008
(Continued)

OTHER PUBLICATIONS

Europe Search Report/Office Action conducted in counterpart Europe Appln. No. 19193379 (dated Feb. 21, 2020).
(Continued)

*Primary Examiner* — Devin K Barnett
(74) *Attorney, Agent, or Firm* — Greenblum & Bernstein, P.L.C.

(57) ABSTRACT

Stacking storage arrangement for containers and method of forming stacking storage arrangement. The stacking storage arrangement includes at least one transverse connector; multiple uprights that are connected to one another by the at least one transverse connector; and connection elements configured to connect the at least one transverse connector to multiple uprights. Each connection element is arranged to bear against a contact surface of an upright and the contact surface includes a slot into which at least one screw protruding through the connection element is screwed.

13 Claims, 3 Drawing Sheets

(58) Field of Classification Search
CPC ......... Y10T 403/4681; Y10T 403/4685; Y10T 403/4674; Y10T 403/4682; Y10T 403/4688
USPC .......................... 52/690, 693, 837, 710, 656.9
See application file for complete search history.

(56) References Cited

U.S. PATENT DOCUMENTS

| | | | | |
|---|---|---|---|---|
| 6,481,177 | B1 * | 11/2002 | Wood | F16B 7/187 52/656.9 |
| 6,516,955 | B1 * | 2/2003 | Dudhwala | H02B 1/01 403/217 |
| 9,702,389 | B2 * | 7/2017 | Oetlinger | F16B 7/187 |
| 2003/0206789 | A1 | 11/2003 | Tai et al. | |
| 2008/0179581 | A1 * | 7/2008 | Mulgrew | E04H 17/1439 256/65.03 |
| 2016/0245320 | A1 | 8/2016 | Oetlinger | |
| 2019/0375589 | A1 | 12/2019 | Gravelle et al. | |
| 2019/0375590 | A1 | 12/2019 | Gravelle et al. | |

FOREIGN PATENT DOCUMENTS

| | | |
|---|---|---|
| CN | 108482928 | 9/2018 |
| CN | 110065750 | 7/2019 |
| DE | 2234503 | 2/1973 |
| DE | 2241061 | 2/1974 |
| DE | 2241061 A1 * | 2/1974 ............... E04B 2/78 |
| DE | 20309331 | 9/2003 |
| EP | 4203823 | 8/1993 |
| EP | 2907410 | 8/2015 |
| FR | 2149707 | 3/1973 |
| GB | 1360895 | 7/1974 |

OTHER PUBLICATIONS

China Search Report conducted in counterpart China Appln. No. 202010611716.0 (dated Oct. 25, 2021).
China Office Action conducted in counterpart China Appln. No. 202010611716.0 (dated Nov. 6, 2021).
China Office Action conducted in counterpart China Appln. No. 202010611716.0 (dated Apr. 15, 2022) (w/ translation).
China Search Report conducted in counterpart China Appln. No. 202010611716.0 (dated Apr. 2, 2022) (w/ translation).
Ma et al., "User Manual of Huibao Curtain Wall Calculation Software," pp. 259-261 (Apr. 30, 2015).
Zhang et al., "University Freshman Science and Technology Research Foundation," pp. 199-201 (Apr. 30, 2016).

* cited by examiner

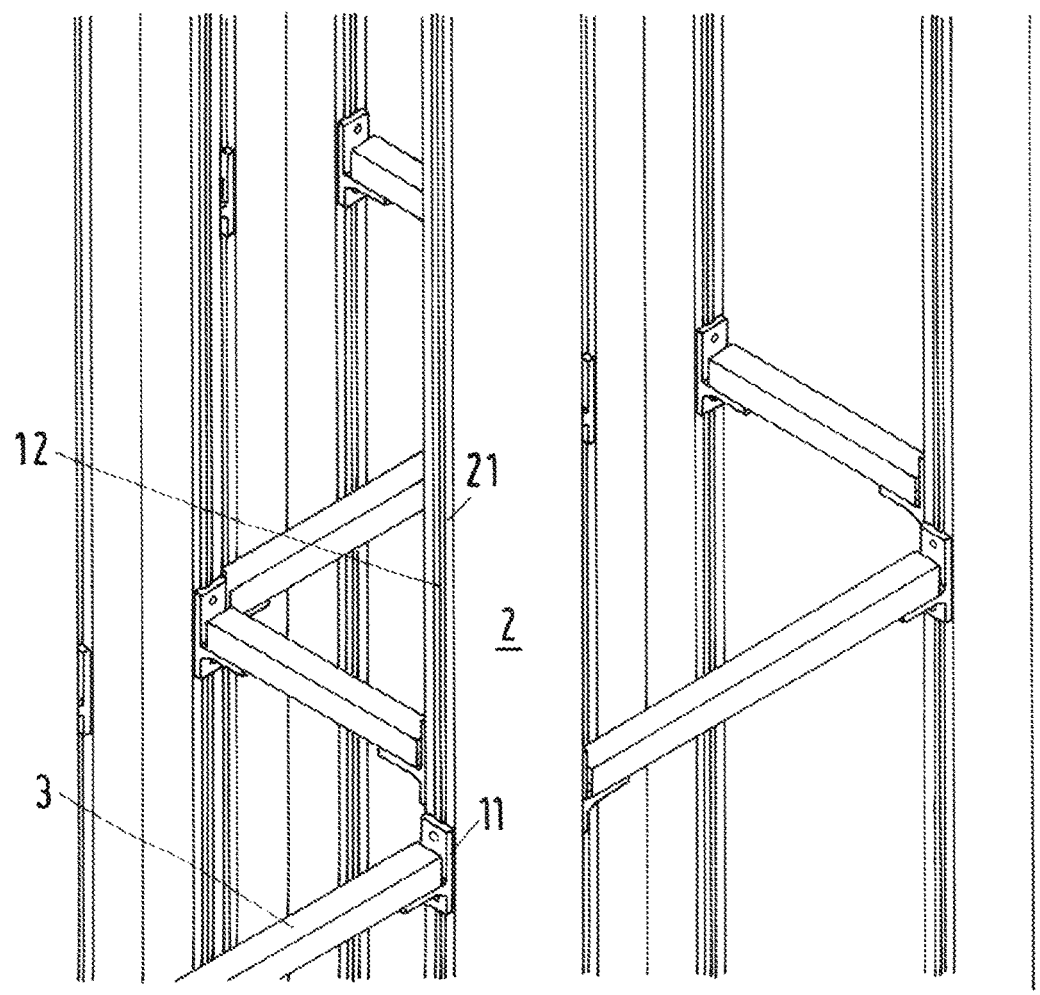
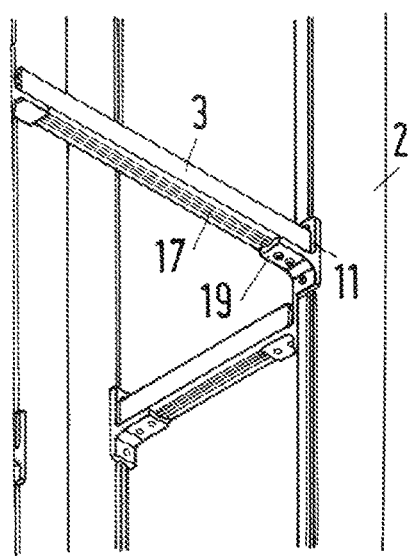
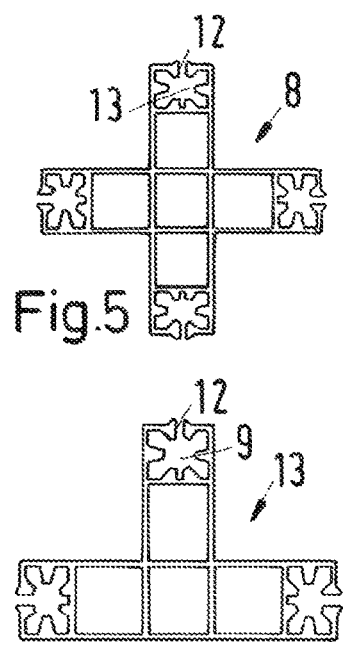
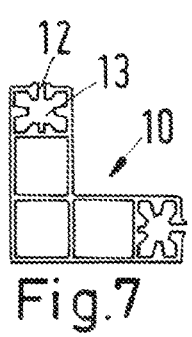

STACKING STORAGE ARRANGEMENT

CROSS-REFERENCE TO RELATED APPLICATIONS

The present application claims priority under 35 U.S.C. § 119 of European Patent Application No. EP 19193379.5, filed Aug. 23, 2019, the disclosure of which is expressly incorporated by reference herein in its entirety.

BACKGROUND

1. Field of the Invention

The present invention relates to a stacking storage arrangement for containers, having multiple uprights that are connected to one another by transverse connectors.

2. Discussion of Background Information

A stacking storage arrangement of this type is known from DE 42 03 823 C2, for example.

In a stacking storage arrangement, containers can be stored in the form of stacks, that is, multiple containers are arranged on top of one another in the direction of gravity. Stacks of this type can be arranged such that they are relatively closely adjacent, so that an available installation space can be used with a high degree of utilization. Here, the uprights can be arranged at the corners of container receiving spaces. The transverse connectors are used to impart the entire arrangement with a certain mechanical stability.

With a stacking storage arrangement of this type, there are several possibilities. The containers can be placed onto the respective stack from above and also removed from there, or the containers can be placed into the stack from below and also removed from there. In the former case, the uprights can be used to support a driving surface on which the operating devices with which the containers can be removed from the stacking storage arrangement can be moved. In the latter case, the uprights are used, for example, to bear an upper covering to be able to close the stacking storage arrangement.

The assembly of a stacking storage arrangement of this type requires a significant effort.

SUMMARY

Embodiments minimize the effort for the assembly of a stacking storage arrangement.

In embodiments, a stacking storage arrangement of the type named at the outset includes at least one transverse connector connected to uprights via connection elements. Each of the connection elements bears against a contact surface of an upright, and the contact surface comprises a slot into which at least one screw protruding through the connection element is screwed.

With an arrangement of this type, it is no longer necessary to align the uprights and transverse connections with one another prior to connection in such an exact manner that bores in the connection elements and in the uprights coincide to a sufficient extent. Instead, the connection element can be moved relative to the respective upright in the direction of the slot. A screw can be screwed into the slot. This screw is then self-cutting or self-tapping, that is, it creates the thread thereof on its own. Because a slot is already present, it is not necessary to create a bore therefor.

Preferably, the slot is continuous over the length of the upright. It is thus possible to attach the transverse connectors at virtually any desired position of the uprights. Multiple transverse connectors can also be distributed over the length of the upright without an exact alignment being necessary in this case.

Preferably, the slot is embodied in a projection and the connection element laterally grips around the projection. A sufficient material thickness can be provided in the projection. The screw is thus held to a sufficient extent. If the connection element grips laterally around the projection, a spreading of the upright in the region of the projection can be prevented, so that the screw is also securely held. It is thereby not necessary that the connection element protrude laterally past the upright.

Preferably, the projection comprises outer sides that are sloped relative to an axis of the screw. If the slope is symmetrical, then the projection has the form of a trapezoid in cross-section. If the connection element is tightened using the screw, then the connection element acts on the outer sides of the projection and presses the outer sides inwards so that a lateral force that further increases the holding capacity and the load bearing capacity is exerted on the screw.

Preferably, the connection element comprises sloped inner sides, the slope of which is matched to the corresponding outer sides. There thus results a pairing of wedge surfaces that act in the direction of a reduction in width of the slot when the screw is tightened and therefore impart a sufficient holding force to the screw.

Preferably, the slot extends all the way into a cavity of the upright. The upright can thus be embodied to be hollow, which reduces the mass and, and as a result, facilitates transport. Furthermore, by using an upright with a cavity, larger tolerances for the length of the screw with which the connecting element is connected to the upright can be permitted. In addition, this embodiment has the advantage that the production of the upright can be designed in an economical manner. If the slot produces a connection from the cavity outwards, the cavity is no longer closed. In the case of production by extrusion, closed cavities are much more costly to produce.

Preferably, the upright is embodied as an extruded element or roll formed profile. An extruded element can be fabricated cost-effectively. It can be produced by extrusion, for example. A roll formed profile can also be fabricated cost-effectively, and is available as a semi-finished product.

Preferably, three types of uprights are provided, wherein a first type has a cross-like cross-section, a second type has a T-shaped cross-section, and a third type has an angled cross-section. With these three types of uprights, all possible configurations in a stacking storage arrangement can be covered. The first type of uprights with the cross-like cross-section can be arranged in the middle of the stacking storage arrangement. The second type with the T-shaped cross-section can be arranged along the edges of the stacking storage arrangement. The third type with the angled cross-section can be arranged at the corners of the stacking storage arrangement. It is thus possible to embody the stacking storage arrangement with "smooth" surfaces on all sides, that is, without elements of the uprights projecting outwards.

Preferably, the uprights of the first type are arranged in rows, wherein the uprights of one row are arranged such that they are staggered from uprights of an adjacent row. It is thus not necessary to arrange an upright at each corner of every container stack, that is, at each corner of a container receiver space. Instead, it is sufficient if the uprights of the first type are arranged on diagonals of the container receiver spaces, for example. On the one hand, this saves material. On the other hand, a space between the container receiving spaces remains free, which space can be used, for example, to arrange a fire extinguishing device in this location.

Preferably, the transverse connectors comprise a slot into which a screw protruding through the connection element is screwed. For the attachment of the transverse connectors to the connection element, the same approach can be used as for the attachment of the connection elements to the uprights.

Preferably, the slot is arranged in a projection around which the connection element laterally grips. In this case, the connection element also prevents the slot from expanding when the screw is screwed in, that is, it prevents the width thereof from increasing, as a result of which the screw can be retained in the slot with the necessary force.

Preferably, the projection comprises side flanks that are sloped towards an axis of the screw, and the connection element comprises in particular sloped inner sides, the slope of which is matched to the slope of the side flanks. The connection element thus acts on wedge surfaces so that the sides of the projection are loaded in the direction of a reduction in width of the slot.

Preferably, the connection element comprises a load bearing section to which the transverse connector is attached, wherein the load bearing section is arranged below the transverse connector. This facilitates production. The connection element is first connected to the upright at the desired height. The transverse connector can subsequently be placed onto the connection element or onto two connection elements and, if necessary, the connection elements can be aligned as desired. After this, one or more screws then only need to be screwed into each connection element, and the transverse connector is attached to the connection element. Because the transverse connector also comprises a slot, certain length tolerances are acceptable here.

Preferably, the transverse connector is embodied as an extruded element or roll formed profile. An extruded element or roll formed profile can be produced cost-effectively. It can be cut to any desired length from a semi-finished product. In the case of the transverse connectors, this can by all means take place on-site.

Preferably, the slot extends all the way into a cavity in the transverse connector. Because of the cavity, the transverse connector can be embodied with a lower mass. The cavity permits large tolerances for the length of the screw used.

Embodiments are directed to a stacking storage arrangement for containers, which includes at least one transverse connector; multiple uprights that are connected to one another by the at least one transverse connector; and connection elements configured to connect the at least one transverse connector to multiple uprights. Each connection element is arranged to bear against a contact surface of an upright, and the contact surface include a slot into which at least one screw protruding through the connection element is screwed.

Embodiments are directed to a method of constructing the above-described stacking storage arrangement for containers. The method includes connecting the at least one transverse connector to multiple uprights by placing a connection element, which has at least one protruding screw, to bear against the contact surface of an upright and over the slot in the contact surface; and screwing the at least one protruding screw into the slot.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 shows an enlarged illustration for the purpose of explaining the connection of uprights and transverse connectors;

FIG. 4 shows a detail from FIG. 3 in a bottom view;

FIG. 5 shows a first type of uprights;

FIG. 6 shows a second type of uprights;

FIG. 7 shows a third type of uprights;

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
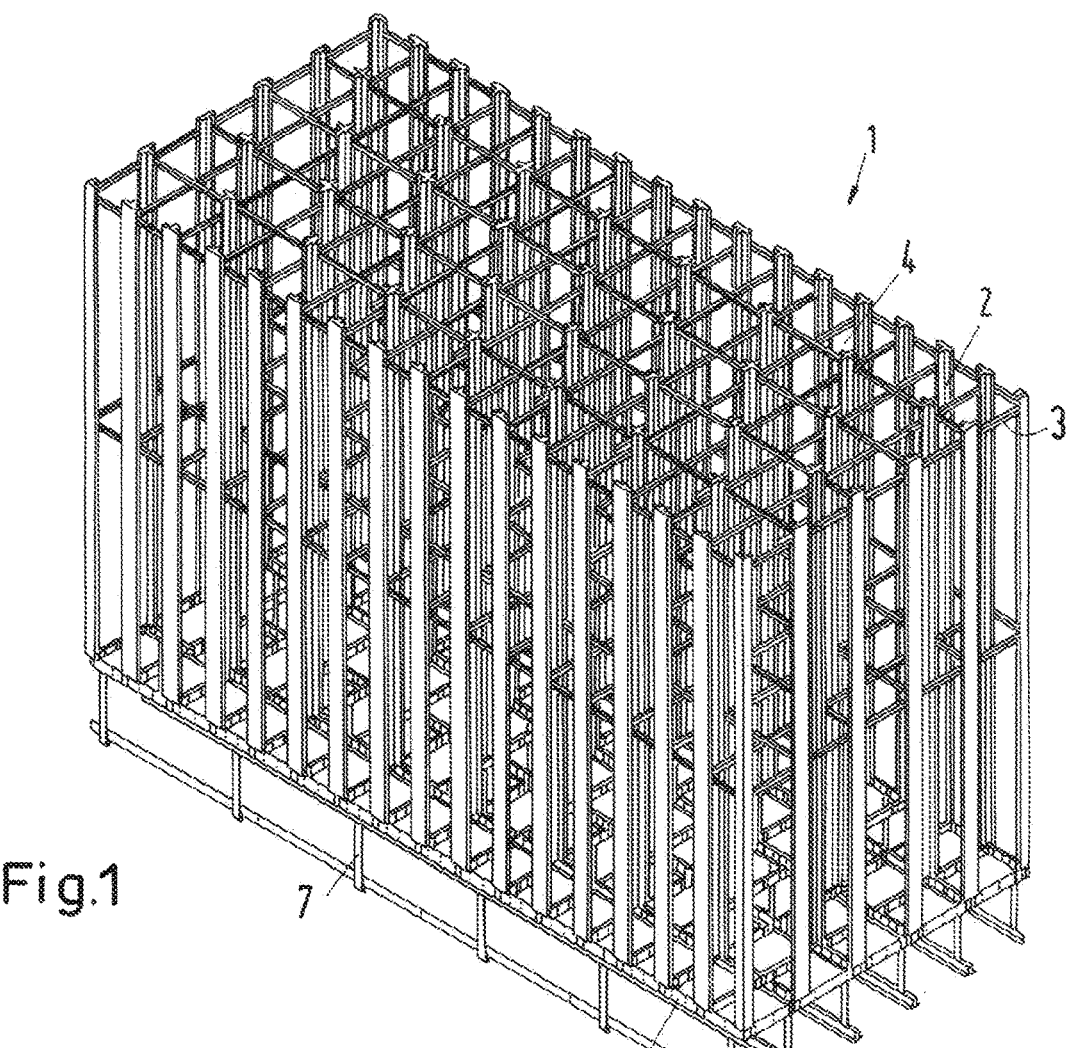
FIG. 1 shows a schematic illustration of a stacking storage arrangement.

FIG. 1 schematically shows a stacking storage arrangement 1 having uprights 2 that are connected to one another by transverse connectors 3.

Multiple container receiving spaces 4 are provided in the stacking storage arrangement. The container receiving spaces 4 are arranged in the form of a matrix, that is, there are columns and rows of container receiving spaces. In the present case, there are five columns and sixteen rows.

Below the container receiving spaces 4, a loading space 5 is arranged into which a loading vehicle can be made to drive in order to introduce a container into the stacking storage arrangement or to remove a container from the stacking storage arrangement.

Here, the term "container" is not limited to closed containers. In this case, a "container" is understood as meaning a piece of equipment that is capable of receiving products and is stackable. The "container" can therefore also be open at the sides.

The uprights 2 are attached to a frame 6 that stands on the flooring or another contact surface via support elements 7.

Figure 2:
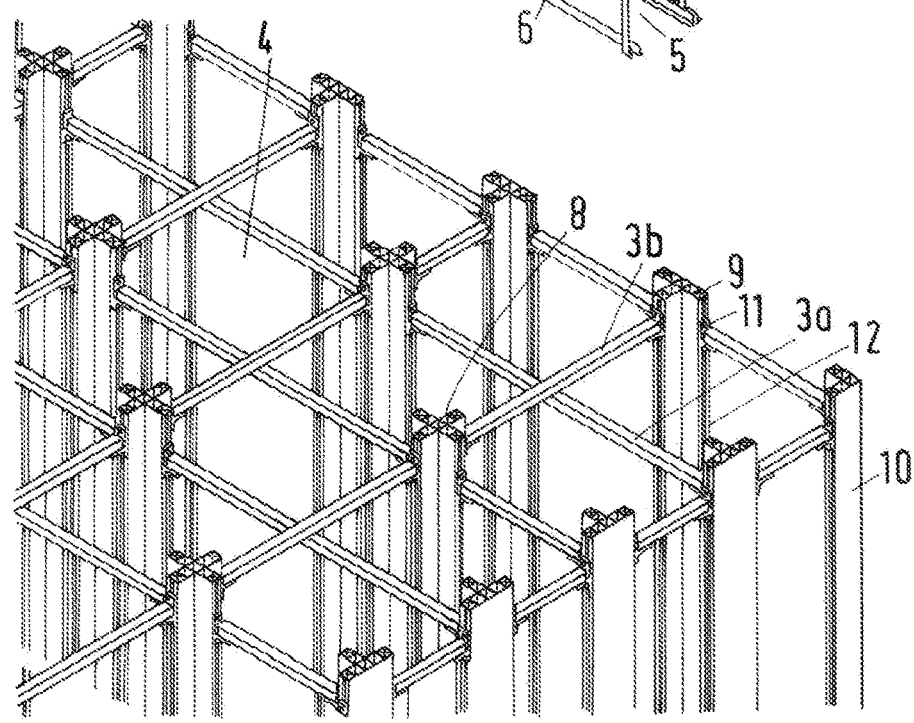
FIG. 2 shows an enlarged detail from FIG. 1.

As can be seen in FIG. 2 and in FIGS. 5 through 7, there are three types of uprights. A first type 8 of uprights is illustrated in FIG. 5. The first type 8 of uprights has a cross-like cross-section, that is, there are four possibilities for attaching a connection element 11.

A second type 9 of uprights is illustrated in FIG. 6. The second type 9 has a T-shaped cross-section, that is, there are three possibilities for attaching a connection element 11.

The third type 10 of uprights, which is illustrated in FIG. 7, has an angled or V-shaped cross-section, that is, there are two possibilities for attaching a connection element 11.

As can be seen in FIG. 2, uprights of the first type 8 are arranged in the middle of the stacking storage arrangement. Uprights of the second type 9 are arranged along the longitudinal and transverse sides of the stacking storage arrangement. Uprights of the third type 10 are arranged at the corners of the stacking storage arrangement.

As can be seen in particular in FIG. 2, the uprights 8 of the first type are arranged in multiple rows, wherein the uprights are arranged in a staggered manner in the rows. Thus, for a container receiving space in the interior of the stacking storage arrangement, an upright is not located at every corner of the container receiving space 4, but rather the uprights are only arranged at diagonally opposite corners.

The aforementioned connection element 11 is provided for the attachment of transverse connectors 3 to uprights 2.

Figure 8:
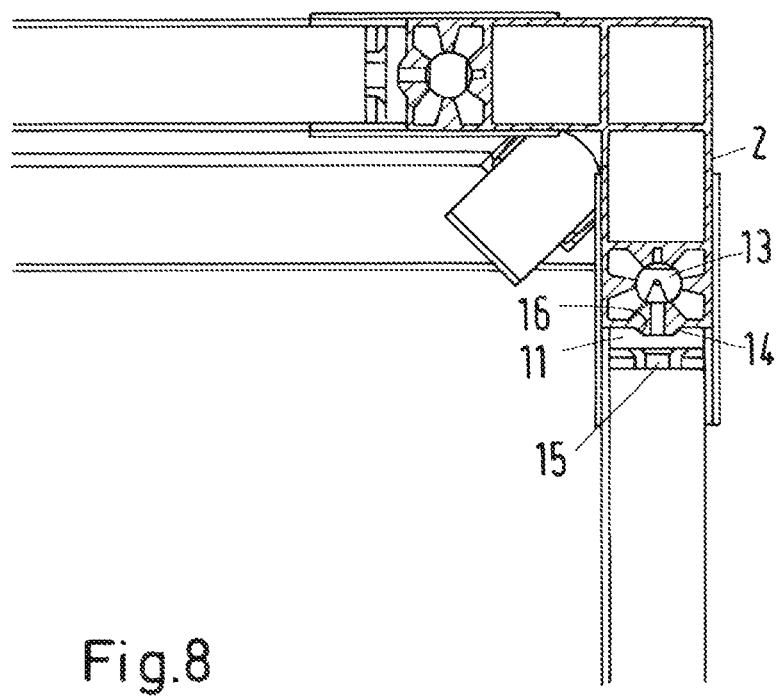
FIG. 8 shows a section through an upright in the region of the connection elements.

In order to be able to attach the connection element 11 to the upright 2, the upright 2 comprises a slot 12. The slot 12 can extend over the entire length of the corresponding upright 2. It extends inwards all the way into a cavity 13. The slot 12 is thereby embodied in a projection 14 (FIG. 8). The projection 14 has sloped outer sides. If a screw 15 is screwed into the slot 12, then the outer sides are sloped relative to an axis of the screw 15. The axis of the screw 15 is the rotation axis about which the screw 15 is turned when being screwed in.

The connection element 11 comprises correspondingly sloped inner sides 16, that is, the slope of the inner sides 16 is matched to the slope of the corresponding outer sides of the projection 14. If the connection element is brought into contact with the upright 2 when the screw 15 is tightened, then the inner sides 16 of the connection element 11 and the outer sides of the projection 14 interact as wedge surfaces, as a result of which it is prevented that the width of the slot 12 increases when the screw 15 is screwed in. There thus results a defined width of the slot 12, to which width the screw 15 can be matched.

The screw 15 is a self-tapping or self-cutting screw. The thread of the screw 15 is thus not connected over the entire circumference thereof to the upright 2 and the projection 14. However, the engagement between the projection 14 and the screw 15 is sufficient to allow a tension force to be produced with which the connection element 11 is securely held on the upright 2.

The slot 12 is continuous over the entire length of the upright 2. It is thus essentially possible to mount a connection element 11 at any position on the upright 2.

The resulting advantage can be seen from FIG. 2, for example. Transverse connectors 3a that run in one direction are mounted at a different height than transverse connectors 3b that run transversely to the former transverse connectors 3a. Accordingly, the corresponding connection elements 11 are also mounted at different heights.

Figure 9:
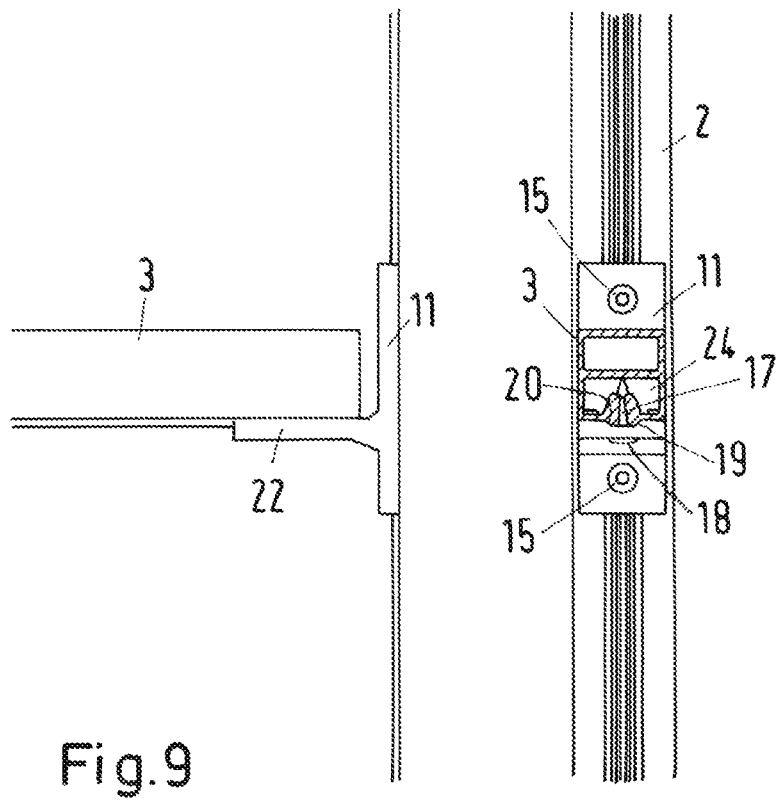
FIG. 9 shows a section through a transverse connector in the region of a connection element.

The transverse connectors 3 are connected to the connection elements 11 in a similar manner. This can be seen with the aid of FIG. 9. Each transverse connector 3 also comprises a slot 17 into which a screw 18 that protrudes through the connection element 11 is screwed. The slot 17 is also arranged in a projection 19 that comprises sloped outer sides. The outer sides are sloped towards the rotation axis of the screw 18. The connection element 11 comprises a recess with sloped inner sides, the slope of which is matched to the slope of the outer sides of the projection 19. There thus results in this case the same technical effect as with the attachment of the connection element 11 to the upright 2. The transverse connector 3 likewise comprises a cavity 24. The slot 17 extends all the way into the cavity. When the screw 18 is screwed into the slot 17, it can protrude all the way into the cavity 24.

The installation of a stacking storage arrangement of this type is relatively simple. A connection element 11 is attached to an upright in that it is brought into contact with a contact surface 21 of the upright 2 and thereby grips around the projection 14. The connection element 11 can then also be slid parallel to the longitudinal extension of the upright 2 until it has reached its desired position. It is then merely necessary to attach the connection element to the upright 2 using two screws 15.

Analogously, a further connection element 11 is attached to an opposing upright 2. The connection element 11 comprises a load bearing section 22 that is directed towards the respective other upright 2. The transverse connector 3 is then placed onto this load bearing section 22 and connected to the connection element 11 using one or two screws.

Both the uprights 2 and also the transverse connectors 3 can be embodied as extruded elements made of aluminum, for example. The uprights 2 and the transverse connectors 3 can also be embodied as rolled profiles.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A stacking storage arrangement for containers, comprising:
   at least one transverse connector;
   multiple uprights that are connected to one another by the at least one transverse connector;
   connection elements configured to connect the at least one transverse connector to multiple uprights;
   each connection element being arranged to bear against a contact surface of a respective upright of the multiple uprights,
   wherein each contact surface comprises a slot to which at least one screw protruding through a respective connection element is screwably connected,
   wherein the slot is embodied in a projection, wherein the projection comprises outer sides that extend outwardly away from the respective upright and the outer sides of the projection are sloped toward each other relative to an axis of the at least one screw;
   wherein a respective connection element from the connection elements is configured to laterally grip around the projection to press the outer sides of the projection inward so that a lateral force is created that increases a holding capacity of the stacking storage arrangement.

2. The stacking storage arrangement according to claim 1, wherein each slot is continuous over an entire length of a respective upright of the multiple uprights.

3. The stacking storage arrangement according to claim 1, wherein the respective connection element comprises sloped inner sides, which are sloped to match the outer sides of the projection.

4. The stacking storage arrangement according to claim 1, wherein the slot extends all the way into a cavity of a respective upright.

5. The stacking storage arrangement according to claim 1, wherein the multiple uprights are embodied as extruded elements or roll formed profiles.

6. The stacking storage arrangement according to claim 1, wherein the multiple uprights comprise three types of uprights:
   a first type having a cross-like cross-section,
   a second type having a T-shaped cross-section, and
   a third type having an angled or V-shaped cross-section.

7. The stacking storage arrangement according to claim 6, wherein the first type of uprights are arranged in rows, such that the uprights of one row are arranged to be staggered from uprights of an adjacent row.

8. The stacking storage arrangement according to claim 1, wherein the at least one transverse connector comprise a slot into which a screw protruding through the connection element is screwed.

9. The stacking storage arrangement according to claim 8, wherein the slot in the at least one transverse connector is embodied in a projection around which the connection element laterally grips.

10. The stacking storage arrangement according to claim 9, wherein the projection on the at least one transverse connector comprises side flanks that are sloped towards an axis of the screw, and the respective connection element comprises second sloped inner sides configured to matched the slope of the side flanks.

11. The stacking storage arrangement according to claim 8, wherein the respective connection element comprises a load bearing section to which the at least one transverse connector is attached, and wherein the load bearing section is arranged below the at least one transverse connector.

12. The stacking storage arrangement according to claim 8, wherein the at least one transverse connector is embodied as an extruded element or roll formed profile.

13. The stacking storage arrangement according to claim 8, wherein the slot in the at least one transverse connector extends all the way into a cavity in the at least one transverse connector.

* * * * *